Sept. 4, 1962 H. J. KUMP 3,052,885

RECORDING HEAD

Filed Dec. 31, 1958

INVENTOR
HERBERT J. KUMP

BY William N. Barret Jr
ATTORNEY 3,052,885

RECORDING HEAD

Herbert J. Kump, Endicott, N.Y., assignor to International Business Machines Corporation, New York, N.Y., a corporation of New York Filed Dec. 31, 1958, Ser. No. 784,219
3 Claims. (Cl. 346—74)

The present invention relates to an apparatus for recording digital or discrete information on a magnetizable material and in particular to a magnetic recording head for discrete non-return to zero recording.

Digital or discrete recording is that method of recording which uses predetermined levels of magnetization in a magnetizable medium as an indication of a limited set of values. In the magnetizable material utilized at the present time for this type of recording, the magnetic characteristics are that for a predetermined applied field, the magnetization increases rapidly to saturation where it will go into its remanent state upon removal of the field. This will be recognized as characteristic of a square hysteresis loop material.

The method of recording used by the apparatus claimed herein is that of opposite saturation of the magnetic medium to indicate either a binary zero or a binary one, which is spoken of as discrete non-return to zero and indicates that the magnetization is in one sense or the other at all times. A problem inherent in this type of magnetic recording is the delay caused by the collapsing field and resulting current which tends to maintain the field along with the inductive delay in building up of the magnetic flux to a sufficient field for saturation in the opposite direction. In the present apparatus, the response time of recording is increased so that there is substantially no delay in recording either a binary one or a binary zero by saturation of the medium in opposite directions.

It is therefore an object of the present invention to provide an improved magnetic recording head for discrete non-return to zero recording.

A further object of this invention is to provide a magnetic recording head which records by not erasing.

Another object of the present invention is to provide a magnetic recording head by which recording may be effected substantially instantaneously.

Another and further object of the present invention is to provide a magnetic recording head by which recording may be effected by merely varying the current flow.

Other objects of the invention will be pointed out in the following description and claims and illustrated in the accompanying drawings, which disclose by way of examples, the principle of the invention and the best mode, which has been contemplated, of applying that principle.

The present invention utilizes a recording head having two flux paths in opposite physical directions to one another to create two areas of magnetic flux. One flux area in combination with a magnetizable medium creates a magnetized area having a particular magnetization which will represent a mark or binary one while the other flux area in combination with a magnetizable medium creates a magnetized area having a particular magnetization which will represent a space or binary zero. In the operation of the recording head, the magnetizable medium is set first to a first magnetization which represents a mark or binary one and then to a second magnetization which represents a space or binary zero. When it is desired to record a binary one or mark, the flux area for the second magnetization is disabled and a portion of the track is left in its first magnetization state.

Figure 1:
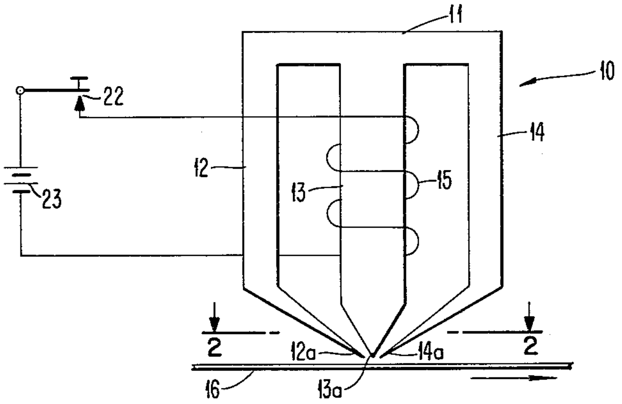
FIG. 1 is a side view of the recording head.
Figure 2:
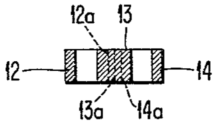
FIG. 2 is a cross section of the recording head taken on line 2—2 of FIG. 1.

The recording head 10 as shown in FIG. 1 contains a center leg 13, two outer legs 12 and 14 and an upper member 11 all made of highly permeable material. Two air gaps between 12*a*—13*a* and 13*a*—14*a* are used to create two areas of magnetizing flux for a magnetizable medium 16 which passes beneath the recording head 10.

The magnetizable medium 16 is composed of a material having a square hysteresis loop for magnetic recording. With a material of this nature, e.g., nickel-cobalt, it is necessary to have a predetermined flux density to set the material to a first or second remanent state. The head 10 with the two air gaps adjacent the magnetizable medium generates a sufficient flux density in each air gap to set the material to first one magnetization and then to the other. This flux density is, however, just sufficient to accomplish the result.

The center leg 13 may be as mentioned previously of highly permeable material in which case the coil 15 is energized continuously by means of the battery 23 and switch 22 shown. When it is desired to record, the switch is opened. The coil and magnetization vectors are shown in accordance with this form. If desired, the center leg 13 of the head 10 may be a permanent magnet of sufficient strength to create the saturating flux necessary to switch the magnetization in medium 16. In this case, the flux created by coil 15 when the switch is closed must be sufficient to bring the flux across the air gaps to less than the minimum required for magnitization.

With the coil 15 energized by closing the switch, a magnetic flux will be created in center leg 13 which will have a downward direction and a return path through legs 12 and 14. The magnetic flux, therefore, through the two air gaps is in opposite directions to one another.

Figure 3:
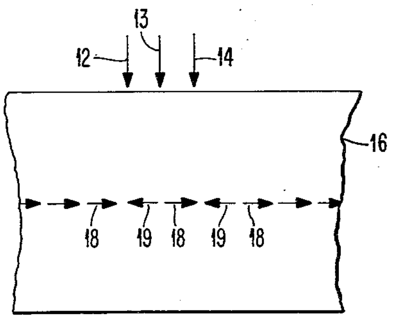
FIG. 3 is a schematic illustration of the magnetization vectors and lines of flux from the recording head into the magnetizable medium.

In FIG. 3, a schematic plan view of the magnetic tape 16 and legs of the recording head 12—14 is shown along with the magnetization vectors created by the flux through the air gaps. Magnetization 18, which is created by the flux through legs 13 and 14 creates a binary zero while the flux through legs 12 and 13 creates a binary one. As noted in FIG. 3, all magnetization vectors, aside from the one beneath the recording head and another represent zero. With the magnetizable medium moving in the direction shown in FIG. 1, the magnetization 19 not beneath the head, represents a binary zero recorded previously.

The operation of the recording head can be readily seen in FIG. 3 where it is noted that magnetization 18 is changed to magnetization 19 between poles 12 and 13 and back to magnetization 18 between poles 13 and 14 so that when no recording is to be made the medium is switched first one way and then the other. When it is desired to record, the current in winding 15 is changed to decrease the flux through leg 13 to allow a magnetization area 19 to pass beneath legs 13 and 14 without being changed. It will be appreciated that in an actual apparatus the magnetizable medium will have particular digit places for recording and that there will be no recording elsewhere. Since there will be no recording between poles 12 and 13 when the current is changed, there will necessarily have to be a space between digit locations in which there will be no recording since it can only have a magnetization 18 if the immediately preceding area is to have a recording made therein.

The apparatus thus provides a reversal of magnetization twice beneath the recording head and a recording merely by reducing the current sufficiently to allow one magnetization to pass from beneath the head. This allows the recording to be effected with substantially no time delay. The recording by means of varying the current also provides an improved apparatus in that there is no necessity for reversing current as in prior recording heads which is a savings in driving circuitry.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited ony as indicated by the scope of the following claims.

What is claimed is:

1. Apparatus for recording on a magnetizable material comprising a first means for establishing a magnetizing field sufficient to set incremental areas of said material to a first magnetization, a second means for establishing a magnetic field sufficient to subsequently set each incremental area to a second magnetization and means for disabling said second means to retain at least one incremental area in a first magnetization.

2. Apparatus for recording on a magnetizable material comprising a first means for establishing a magnetic field sufficient to set incremental areas of said material to a first magnetization, a second means including a portion of said first means for establishing a magnetic field sufficient to subsequently set each incremental area to a second magnetization and means carried by the common portion of said first and second means for disabling said means to retain at least one incremental area in a first magnetization.

3. Apparatus for recording on a magnetizable material comprising an E-shaped magnetic core having the outer legs of said core spaced adjacent the center leg whereby two air gaps are formed with said center leg, a current carrying coil on said center leg to produce a magnetic field through said air gaps and including means for selectively interrupting the current through said coil, means for creating a current through said coil to produce a magnetic field in a first gap sufficient to set incremental areas of said material to a first magnetization and a magnetic field in a second gap sufficient to set said incremental areas of said material to a second magnetization.

References Cited in the file of this patent

UNITED STATES PATENTS

| | | |
|---|---|---|
| 1,366,979 | Ulrich | Feb. 1, 1921 |
| 2,846,517 | Farrand et al. | Aug. 5, 1958 |

FOREIGN PATENTS

| | | |
|---|---|---|
| 776,401 | Great Britain | June 5, 1957 |

UNITED STATES PATENT OFFICE
CERTIFICATE OF CORRECTION

Patent No. 3,052,885 September 4, 1962

Herbert J. Kump

It is hereby certified that error appears in the above numbered patent requiring correction and that the said Letters Patent should read as corrected below.

Column 3, line 11, for "ony" read -- only --; column 4, lines 11 and 12, strike out "and including means for selectively interrupting the current through said coil" and insert the same before the period in line 18, same column 4.

Signed and sealed this 12th day of March 1963.

(SEAL)
Attest:

ESTON G. JOHNSON
Attesting Officer

DAVID L. LADD
Commissioner of Patents